United States Patent
Hill

[19]

[11] Patent Number: 6,043,579
[45] Date of Patent: Mar. 28, 2000

[54] PERMANENTLY EXCITED TRANSVERSE FLUX MACHINE

[76] Inventor: Wolfgang Hill, Ortenebergstr. 3, 76135 Karlsruhe, Germany

[21] Appl. No.: 09/003,164

[22] Filed: Jan. 6, 1998

Related U.S. Application Data

[63] Continuation of application No. PCT/DE96/01182, Jul. 3, 1996.

[51] Int. Cl.[7] .............................. H02K 1/27; H02K 21/12; H02K 16/00
[52] U.S. Cl. .......................... 310/164; 310/156; 310/114; 310/266
[58] Field of Search ..................................... 310/162, 164, 310/266, 268, 112, 114, 261, 254, 216

[56] References Cited

U.S. PATENT DOCUMENTS

| | | | |
|---|---|---|---|
| 3,560,820 | 2/1971 | Unnewehr | 318/138 |
| 4,658,166 | 4/1987 | Oudet | 310/156 |
| 4,682,067 | 7/1987 | Oudet | 310/156 |
| 5,543,674 | 8/1996 | Koehler | 310/164 |

FOREIGN PATENT DOCUMENTS

| | | | |
|---|---|---|---|
| 3705089A1 | 8/1988 | Germany . | |
| 41 25 779 | 12/1992 | Germany | 310/266 |
| 41 38 014 | 2/1993 | Germany | 310/266 |
| 195 47 159 | 6/1996 | Germany | 310/268 |
| WO92/00628 | 1/1992 | WIPO . | |
| WO95/04399 | 2/1995 | WIPO | 310/216 |

*Primary Examiner*—Nestor Ramirez
*Assistant Examiner*—Karl E. I. Tamai

[57] ABSTRACT

The invention concerns a permanently excited transverse flux machine which requires only one permanent magnet segment per phase and per magnetic circuit. The magnetic flux generated by a permanent magnet segment (3) flows alternately through the soft magnetic body on two conductor rings (7) of this transverse flux machine. The conductor rings (7) are arranged on different sides of the permanent magnet segment, the direction of flux in the permanent magnet segments corresponding to the direction of magnetic flux in the two air gaps through which said flux passes. Preferably, the permanent magnet segments are arranged between two U-shaped halves of a square wound C-core constituting the rotor bodies (5). The stator bodies (6) are also prefabricated from grain-oriented materials as U-shaped C-cores.

11 Claims, 3 Drawing Sheets

PERMANENTLY EXCITED TRANSVERSE FLUX MACHINE

This is a continuation of PCT/DE96/01182, filed Jul. 3, 1996, now abandoned.

BACKGROUND OF THE INVENTION

1. Field of the Invention

The invention concerns a transverse flux machine with conductor rings that are enclosed on three sides by U-shaped soft magnetic bodies.

2. Description of Prior Art

The rotor of known permanently excited transverse flux machines consists of a multitude of hard and soft magnetic segments which entails costly prefabrication and assembly. Production costs are increased by the intricate structure, particularly, if in spite of the high magnetic forces a design that is free of vibrations is to be achieved.

In DE 37 05 089 A1, the soft magnetic elements W together with the permanent magnets Md form two rows. Additional permanent magnets Mq are arranged between the soft magnetic elements of the two rows. The block-shaped concentrator segments and the permanent magnets which are arranged checkerboard-style lie between the ends of different U-shaped pole elements. If the soft magnetic elements move in relation to the pole elements, said soft magnetic elements are subjected to a force that is pulling them alternately toward the pole elements on the different sides. These pulsating forces which are offset by 180° at the two sides cause the structure to vibrate and result in considerable stability problems.

In DE 41 38 014 C1 also, permanent magnets are arranged between soft magnetic elements in a ring. The ring consists in direction of the circumference only of slantwise arranged permanent magnets and concentrator segments which are alternating. Said ring is completely disposed between the ends of U-shaped pole elements of a conductor ring. Pulsating forces act in radial direction on the soft magnetic elements. These forces are offset on the inside versus the outside in time by 180°. The excitation causes the ring to vibrate and said ring is therefore not firmly anchored to the rotor.

U.S. Pat. No. 4,658,166 and U.S. Pat. No. 4,682,067 show a synchronous electric motor comprising an axially magnetized rotor disc with opposite flat faces. In circumferential direction an end of a U-shaped member is arranged opposite of only every other magnetic pole. Of the magnetic material used in the construction less than half contributes at any given moment to the generation of torque. High magnet costs limit application of the structure to small motors.

The objective of the present invention is, therefore, to advance a permanently excited transverse flux machine in such a manner that a stable design of the machine is achieved at low material and production costs.

SUMMARY OF THE INVENTION

In accordance with the invention, this objective is achieved by the characteristics of claims 11 and 12. According to the invention, the magnetic flux generated by a permanent magnet flows alternately through the soft magnetic bodies of two conductor rings of a transverse flux machine wherein said conductor rings are arranged on different sides of the permanent magnet and wherein the direction of flux in the permanent magnet corresponds to the direction of flux in the two air gaps through which said flux passes. The permanent magnets are preferably arranged between two U-shaped halves of a square-wound C-core and the cores of stationary members are also prefabricated as U-shaped C-cores from grain-oriented material.

The entire design of the machine features few differentiated, simply designed parts that can be prefabricated, ensuring high stability in the magnetically active machine volume—particularly with reference to the variable air gap forces.

The drawings display advantageous embodiments of the invention.

DETAILED DESCRIPTION OF THE PREFERRED EMBODIMENT

Figure 1:
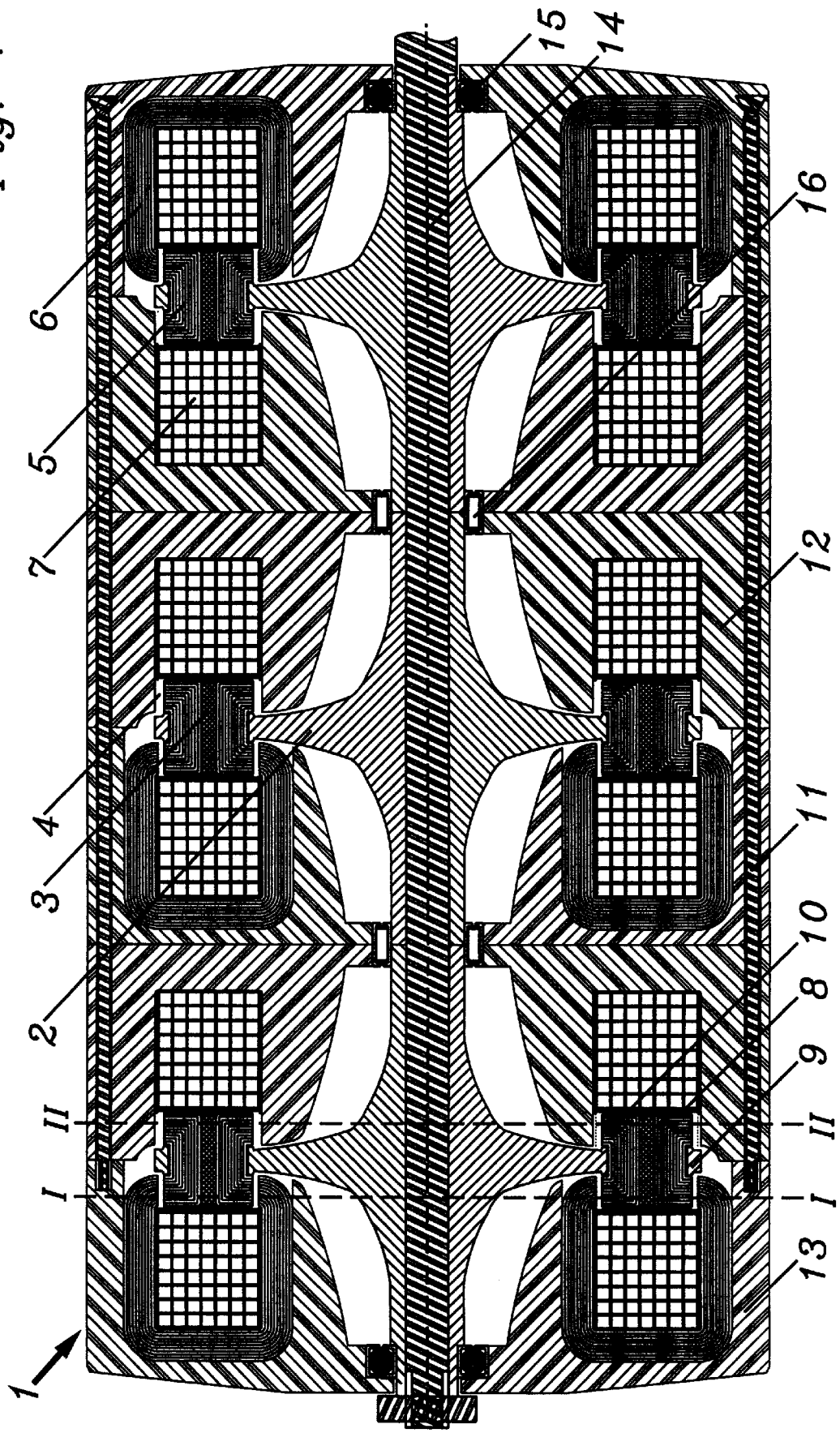
FIG. 1 shows a longitudinal section of a three-phase, permanently excited transverse flux machine as internal rotor with radial air gap flux.

The transverse flux machine (1) of FIG. 1 consists of three identical discs of the moving member (2) into which permanent magnets (3) are integrated, said permanent magnets forming only one ring per phase, and the direction of flux in said permanent magnets corresponding to the direction of flux in the air gap (4). The permanent magnets (3) are arranged between two concentrator segments (5) which concentrate the flux so that the flux density in the air gap is distinctly higher than in the permanent magnets. When turning the moving member, the magnetic circuit generated by a permanent magnet (3) is closed by U-shaped soft magnetic bodies (6) which are axially arranged alternately to the left and to the right of the disc of the moving member (2). Within these U-shaped soft magnetic bodies (6) lie conductor rings (7) made of profile wire which are wound in circumferential direction. The radially acting magnetic forces in the two air gaps (4) of a magnetic circuit are compensated by the dual air gap design. Radial vibration of the ends of the U-shaped soft magnetic bodies (6) is prevented by the stable construction of the conductor rings (7) and by a rigid reinforcement plate (8). In the moving member, a binding ring (9) which is arranged in the middle of the radially outer concentrator segments (5) absorbs the radially acting forces. In addition, the concentrator segments (5) and permanent magnets (3) of the disc of the moving member (2) are glued together and further, mechanical stability and encapsulation of the permanent magnets (3) against environmental influences is ensured by axially attached ring discs (10). In multi-phase transverse flux machines, several identical arrangements are joined by screws (11), said arrangements being set off against each other in circumferential direction by a fraction of a pole pitch. The magnetically passive stationary member consists of four identical inner housing elements (12) and two identical motor shields (13). The identical discs of the moving member (2) are placed onto a square shaft (14). Ball bearings (15) are placed on the axially outer ends, and radial vibrations between the discs of the moving member are prevented by roller bearings (16).

Figure 2:
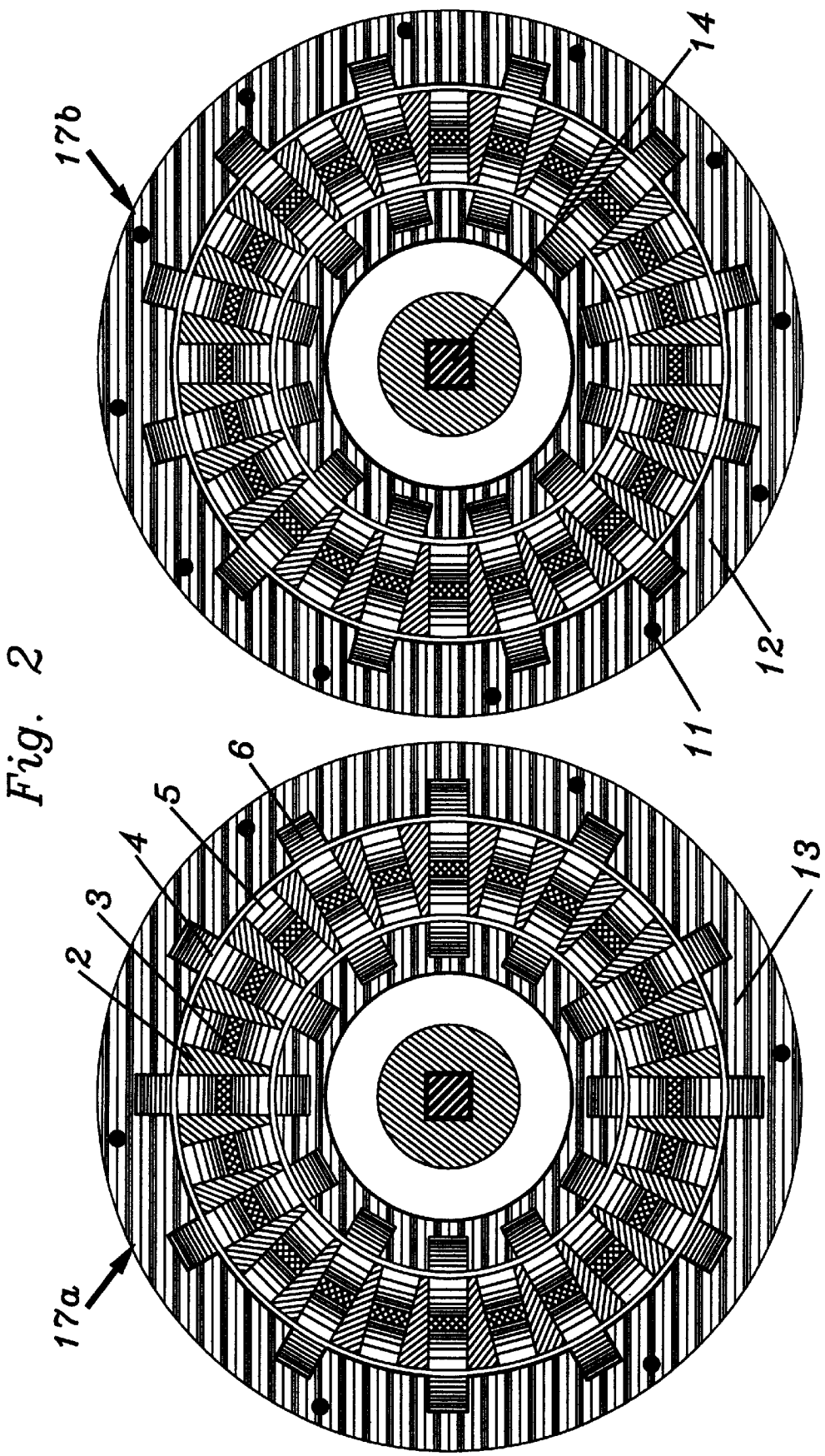
FIG. 2 shows cross sections along the lines I—I and II—II of the 24-pole transverse flux machine of FIG. 1.

FIG. 2 shows cross sections along the lines I—I and II—II of FIG. 1. Both 24-pole halves of a stationary member (17a, b) are identical, however, they are set off against each other in circumferential direction by one pole pitch. The number of U-shaped soft magnetic bodies (6) per one half of a stationary member corresponds to one half of the number of poles of the moving member.

Figure 3:
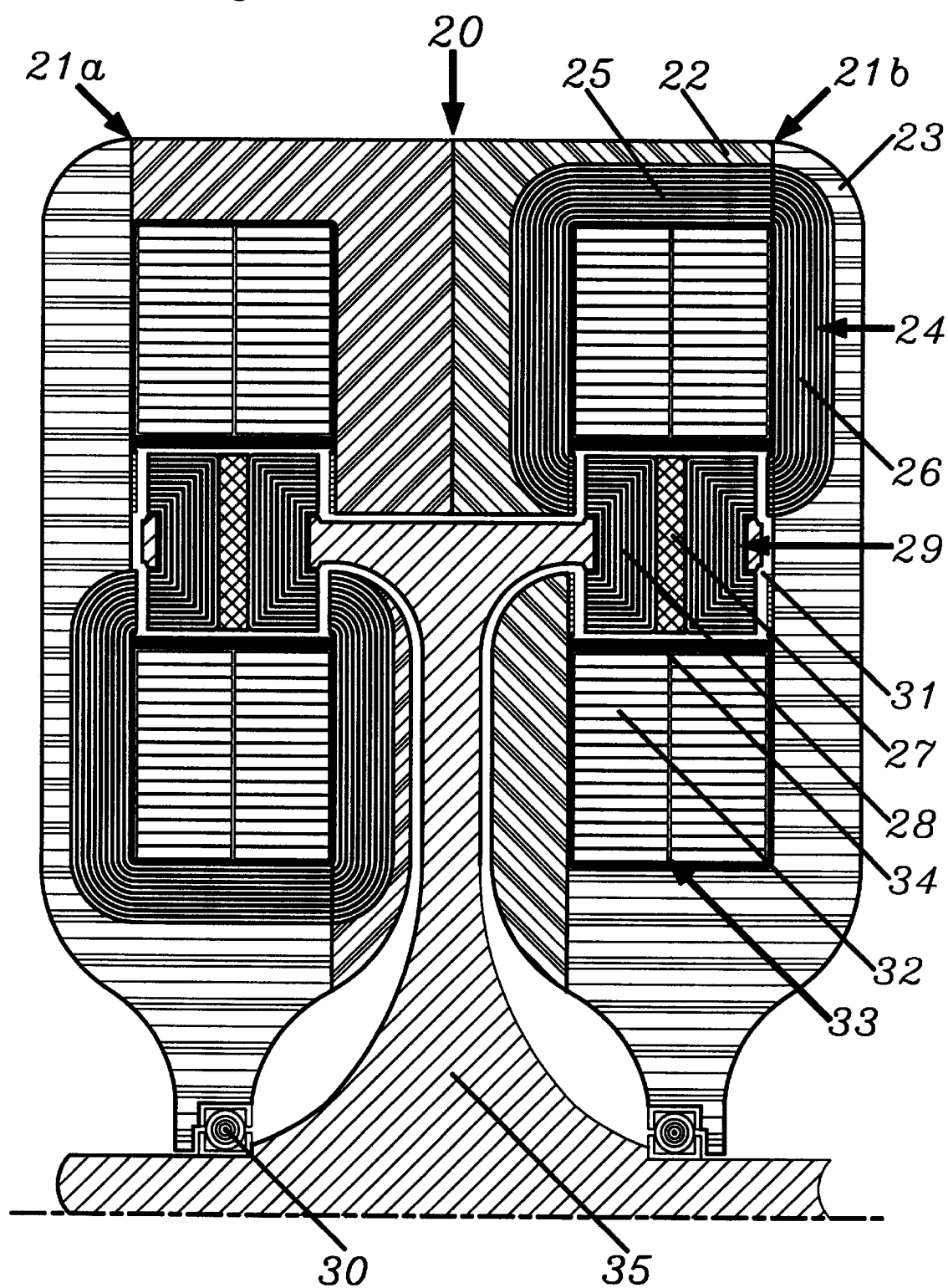
FIG. 3 shows a longitudinal section of a two-phase, permanently excited transverse flux machine as internal rotor with axial air gap flux.

For designs that are shorter in axial direction, the transverse flux machine (20) with axial air gap as shown in FIG. 3 is recommended. The magnetic circuit arrangement of FIG. 1 is rotated 90°, maintaining the advantageous utilization of material as well as low component costs. For easier assembly of the machine, the stationary member consists preferably of two identical halves (21a, b) which in turn possess two different, die-cast stationary member shells (22, 23).

Here also, the U-shaped soft magnetic bodies (24) consist preferably of two C-core parts (25, 26), where the C-core parts (25) attached to the inner stationary member shells (22) are positioned prior to axially attaching the prefabricated rings of the moving member (29), said rings being composed of permanent magnets (27) and concentrator segments (28). Subsequently, the outer stationary member shells (23) with the remaining C-core parts (26) attached are axially slid on together with the bearings (30).

As in the radial flux design in FIG. 1, the permanent magnets (27) may be executed in block shape. In this case, the surfaces facing the air gap (31) do not need to be grind-finished. The conductor rings (33) which are prefabricated from conductor ribbon (32) can be mounted together with their reinforcement casing (34) which is arranged on the air gap side. The T-shaped discs of the moving member (35), instead of manufacturing the same as one piece together with the shaft, may be prefabricated from several sections.

Also possible are variations with rotating conductor rings and fixed permanent magnets as well as external rotor designs.

I claim:

1. A permanently excited transverse flux machine with at least one moving member and a stationary member,
    one of said moving member or said stationary member having at least two conductor rings, each said conductor ring being partially enclosed on three sides by U-shaped soft magnetic bodies having a pair of legs, said one of said moving member or said stationary member having an opening between said legs of said U-shaped soft magnetic body which extend beyond said conductor ring;
    said other of said moving member or said stationary member having a plurality of permanent magnets generating a magnetic flux and at least one concentrator segment consisting of soft magnetic material having a middle portion, each said permanent magnet positioned between the middle portion of two said concentrator segments consisting of soft magnetic material, each said concentrator segment having a pair of end regions, each said end region of said concentrator segments extend to form an air gap with a leg of said U-shaped soft magnetic bodies,
    wherein said magnetic flux in said permanent magnets and said air gap has the same direction.

2. A permanently excited transverse flux machine as recited in claim 1, wherein said magnetic flux from each of said permanent magnets forms alternating magnetic circuits through said U-shaped soft magnetic bodies positioned on two opposite sides of said permanent magnets.

3. A permanently excited transverse flux machine as recited in claim 1, wherein said magnetic flux from each of said permanent magnets forms magnetic circuits, each said magnetic circuit comprising only one said permanent magnet.

4. A permanently excited transverse flux machine as recited in claim 1, wherein inside said opening of said U-shaped soft magnetic bodies is arranged a reinforcement plate or a reinforcement casing, said reinforcement plate or reinforcement casing being made of electrically and magnetically non-conductive material.

5. A permanently excited transverse flux machine as recited in claim 1, wherein two conductor rings of said at least two conductor rings are positioned on opposite sides of one of said permanent magnets.

6. A permanently excited transverse flux machine as recited in claim 1, wherein said middle portions of said concentrator segments are joined plane onto two opposite sides of said permanent magnets, said permanent magnets and said concentrator segments are arranged in an annulus, at least two of said U-shaped soft magnetic bodies are arranged on opposite sides of said annulus causing said annulus to lie partially within said openings of said at least two U-shaped soft magnetic bodies.

7. A permanently excited transverse flux machine as recited in claim 1, wherein said permanent magnets and said concentrator segments are arranged in the recesses of an annular body made of magnetically and electrically non-conductive material.

8. A permanently excited transverse flux machine with at least one moving member and a stationary member,
    one of said moving member or said stationary member having at least two conductor rings, each said conductor ring being partially enclosed on three sides by U-shaped soft magnetic bodies having a pair of legs, said one of said moving member or said stationary member having an opening between said legs of said U-shaped soft magnetic body which extends beyond said conductor ring;
    said other of said moving member or said stationary member having a plurality of permanent magnets generating a magnetic flux and at least one concentrator segment consisting of soft magnetic material having a middle portion, each said permanent magnet positioned between the middle portion of two said concentrator segments consisting of soft magnetic material, each of said concentrator segments having a pair of end regions, each said end region of said concentrator segments extending to form an air gap with a leg of said U-shaped soft magnetic bodies,
    wherein said permanent magnets and said concentrator segments are arranged in an annulus, two conductor rings of said at least two conductor rings are positioned on opposite sides of said annulus, said U-shaped soft magnetic bodies of said at least two conductor rings enclose said annulus on two opposite sides, causing said annulus to lie partially within said openings of said U-shaped soft magnetic bodies.

9. A permanently excited transverse flux machine as recited in claim 8, wherein a binding ring is arranged on a side of said annulus, said annulus being arranged outside said openings of said U-shaped soft magnetic bodies.

10. A permanently excited transverse flux machine as recited in claim 8, wherein said machine comprises a magnetically and electrically passive housing and moving members, said housing and moving members consisting in part of identical, non-cut prefabricated elements.

11. A permanently excited transverse flux machine as recited in claim 8, wherein said annulus is attached to a disc of the moving member by screws which are arranged between said permanent magnets and said concentrator segments.

* * * * *